United States Patent [19]
Seko

[11] Patent Number: 4,967,319
[45] Date of Patent: Oct. 30, 1990

[54] HEADLIGHT APPARATUS FOR AUTOMOTIVE VEHICLE
[75] Inventor: Yasutoshi Seko, Yokohama, Japan
[73] Assignee: Nissan Motor Co., Ltd., Yokohama, Japan
[21] Appl. No.: 346,484
[22] Filed: May 2, 1989
[30] Foreign Application Priority Data
  May 2, 1988 [JP] Japan .................. 63-107612
[51] Int. Cl.⁵ .............................. B60Q 1/02
[52] U.S. Cl. ........................ 362/61; 362/66; 362/80; 362/420; 362/428
[58] Field of Search ............. 362/61, 80, 66, 71, 362/418, 419, 420, 428

[56] References Cited
U.S. PATENT DOCUMENTS

| | | | |
|---|---|---|---|
| 2,016,243 | 10/1935 | Fraser | 240/41.61 |
| 3,316,442 | 4/1967 | Zuse | 315/83 |
| 3,393,344 | 7/1968 | Engelmann | 315/82 |
| 3,736,416 | 5/1973 | Goodwin | 240/46.21 |
| 4,620,267 | 10/1986 | Cibie | 362/71 |
| 4,768,135 | 8/1988 | Kretschmer et al. | 362/66 |
| 4,875,141 | 10/1989 | Miyauchi et al. | 362/61 |

FOREIGN PATENT DOCUMENTS

| | | | |
|---|---|---|---|
| 1297061 | 6/1969 | Fed. Rep. of Germany | 362/61 |
| 2409564 | 4/1975 | Fed. Rep. of Germany | 362/61 |
| 1394222 | 5/1975 | Fed. Rep. of Germany | 362/61 |
| 3601388 | 7/1987 | Fed. Rep. of Germany | 362/66 |
| 3743137 | 6/1988 | Fed. Rep. of Germany | 362/80 |
| 1079194 | 11/1954 | France . | |
| 2114598 | 6/1972 | France . | |
| 2228367 | 11/1974 | France | 362/61 |

Primary Examiner—Ira S. Lazarus
Assistant Examiner—Sue Hagarman
Attorney, Agent, or Firm—Foley & Lardner, Schwartz, Jeffery, Schwaab, Mack, Blumenthal & Evans

[57] ABSTRACT

To accurately shade headlamp light for both a leading vehicle running on the same lane and an opposed vehicle running on an opposed lane, the headlight apparatus for an automotive vehicle comprises a movable headlamp, a light sensor attached on the pivotal headlamp for detecting presence of a leading vehicle, an adjusting mechanism for adjusting the optical axis of the headlamp, a controller for actuating the adjusting mechanism in response to sensor signals of the light sensor to move the headlamp so that angle of headlamp optical axis can be adjusted according to distance to a leading vehicle, and a shading plate disposed independently from the optical axis motion of the headlamp for shading light for an opposed vehicle.

8 Claims, 10 Drawing Sheets

HEADLIGHT APPARATUS FOR AUTOMOTIVE VEHICLE

BACKGROUND OF THE INVENTION

1. Field of the Invention

The present invention relates to a headlight apparatus for an automotive vehicle, and more specifically to a headlight apparatus which can control a headlight beam from high beam to low beam or vice versa by adjusting the angle of optical axis of the headlamp.

2. Description of the Prior Art

In general, the headlight apparatus for an automotive vehicle can be switched manually or automatically from high beam (used when the vehicle is running on a road where no opposed vehicle is running) to low beam (used when the vehicle is running on a road where an opposed vehicle is running or on a bright town or city road) or vice versa.

Japanese Published Unexamined (Kokai) Utility Model Application No. 60-61942 discloses an example of prior-art headlight apparatus by which low and high beams can be switched automatically.

In this prior-art headlight apparatus, there are provided a vehicle speed sensor for detecting its own vehicle speed and an other vehicle presence sensor for detection the presence of other vehicles such as opposed vehicles (running on an opposing lane in the opposite direction) and leading vehicles (running on the same lane in the same direction), and the angle of optical axis of the headlamp can be adjusted automatically according to output signals from the vehicle speed sensor, and further the adjusted angle of the headlamp optical axis is restricted in response to output signals from the other vehicle presence sensor. That is, in this prior-art headlamp apparatus, the optical axis of the headlamp is adjusted upward when the vehicle is running at high speed so that the headlamp reaches a long distance, but adjusted downward when the other vehicle presence sensor detects other opposed or leading vehicles so that the headlamp illumination distance can be shortened to prevent other vehicle's drivers from being dazzled.

In the above-mentioned prior-art headlight apparatus, the high beam can be adjusted so as to reach the maximum distance to a leading vehicle when an opposed vehicle is absent. However, when an opposed vehicle is detected by the other vehicle presence sensor, since sensor signals from the other vehicle presence sensor have priority over sensor signals from the vehicle speed sensor, there exists a problem in that there exists a certain non-sufficiently illuminated area between the headlight apparatus and a leading vehicle, in particular, when the vehicle on which the headlight apparatus is mounted is running at high speed.

SUMMARY OF THE INVENTION

With these problems in mind, therefore, it is the primary object of the present invention to provide a headlight apparatus for an automotive vehicle which can illuminate all the road surface area to a leading vehicle while securely preventing opposed and leading vehicle's drivers from being dazzled.

To achieve the above-mentioned object, a headlight apparatus for an automotive vehicle according to the present invention comprises: pivotal headlamp means (H) for emitting light; (b) first sensor means (13), attached to said headlamp means, for detecting presence of a leading vehicle and generating sensor signals corresponding thereto; (c) adjusting means (8, 9, 10), associated with said headlamp means, for adjusting the optical axis of said headlamp means; (d) control mean, (18), coupled to said first sensor means and said adjusting means, for actuating said pivoting means in response to sensor signals generated by said first sensor means to adjust the optical axis of said headlamp means to such a that a leading vehicle can be detected by a predetermined position on said first sensor means and therefore angle of an optical axis of said pivotal headlamp means can be adjusted according to distance to a leading vehicle; and (e) first fixed shading means (20), fixedly disposed independently from optical axis motion of said headlamp means, for shading part of light emitted by said headlamp means for an opposed vehicle.

The first sensor means comprises a plurality of vertically arranged light sensing elements (E1 to E5), and said control means actuates said pivotal headlamp means via said adjusting means in response to plural sensor signals of said first sensor means to such a position that tail lamps of a leading vehicle can be detected by a middle light sensing element (E3) of said first sensor means when the brightest headlight zone of said headlamp means reaches lower end portions of rear wheels of a leading vehicle. The first fixed shading means is a rectangular plate (20) whose lower inner corner is cut out into a triangular or trapezoidal shape and is arranged with the cutout portion located near the optical axis of the headlamp means.

Further, it is preferable to further provide second fixed shading means (20B) disposed on the headlamp means for clearly defining an upper shade line of headlight for a leading vehicle. Further, it is also preferable to provide a first movable shading means (20C) instead of the first fixed shading means (20A), a second sensor means (13B) for detecting presence of an opposed vehicle, and a first actuating means (30, 31, 32) for actuating said first movable shading means (20C) in response to sensor signals from said second sensor means so that an upper shade line of headlight can be defined for a detected opposed vehicle.

Further, it is also preferable to provide second movable shading means (20D) instead of the second fixed shading means (20B), and second actuating means (34, 35, 36) for actuating said second movable shading means according to the optical axis of said headlamp means so that light distrubution angle between the brightest headlight zone and the upper headlight shade line can be adjusted according to distance to a heading vehicle.

In the headlight apparatus according to the present invention, since the angle of headlamp optical axis can be adjusted according to distance to a leading vehicle on the basis of sensor signals indicative of the presence of a leading vehicle, it is possible to surely illuminate all the road surface area to a leading vehicle. Further, part of headlight beam is securely shaded for opposed vehicles, irrespective of the position of headlamp optical axis, under the condition that the headlamp optical axis is kept upward or downward.

DETAILED DESCRIPTION OF THE PREFERRED EMBODIMENTS

Figure 1:
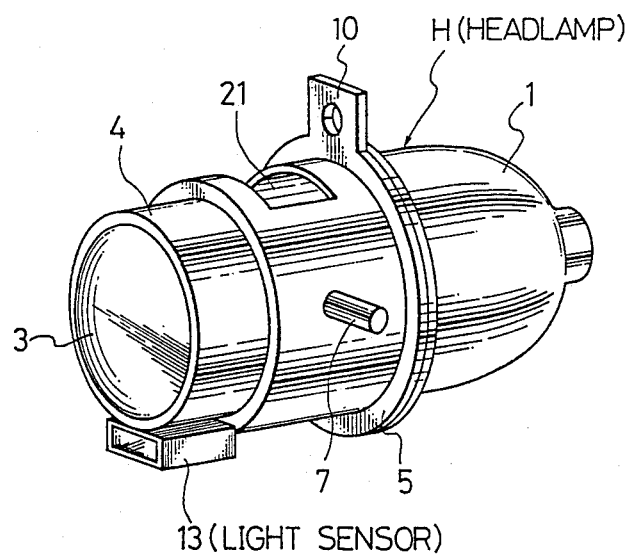
FIG. 1 is a perspective view showing a first embodiment of the headlight apparatus according to the present invention.
Figure 2:
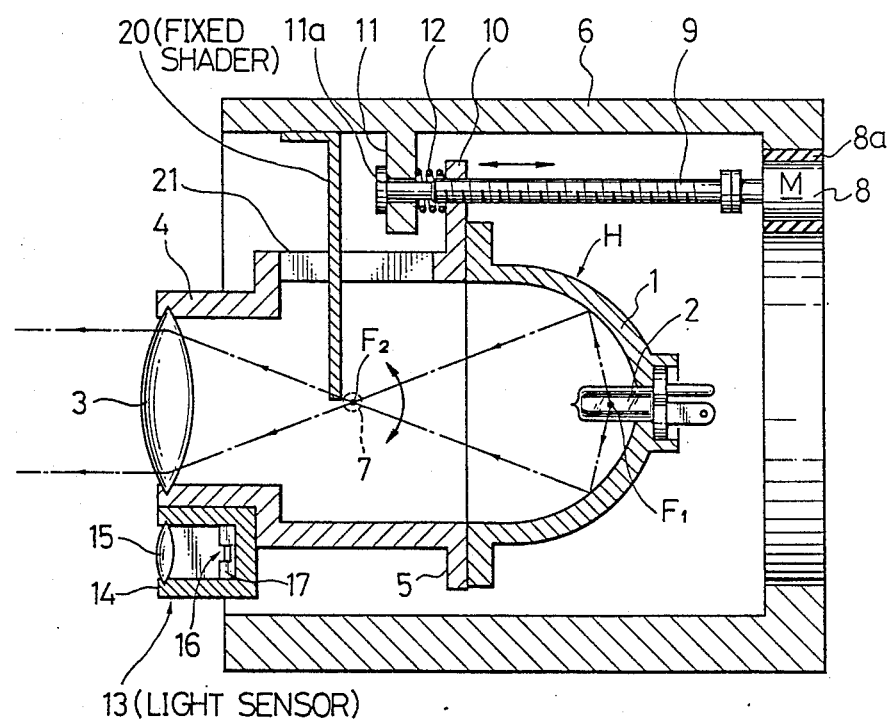
FIG. 2 is a cross-sectional view showing the first embodiment thereof.

With reference to FIGS. 1 and 2, a first embodiment of the headlight apparatus according to the present invention will be described hereinbelow. A headlamp H comprises a half egg-shaped (oval in cross section) reflector 1, a light source bulb 2, a condenser lens 3, a front cylindrical member 4 fixed to the reflector 1, two pivotal pins 7, and a light sensor 13. A headlamp housing is formed by fixing two flange portions of the reflector 1 and the front cylindrical member 4 by welding, for instance. The headlamp housing forms a first focal point $F_1$ and a second focal point $F_2$. The bulb 2 is positioned at the first focal point $F_1$, and the condenser lens 3 is supported by a front aperture portion of the front cylindrical member 4 at such a position that the focal point of the lens 3 is located at the second focal point $F_2$ of the reflector 1. The pins 7 are attached to the outer circumferential surface of the front cylindrical member 4 at the second focal point $F_2$.

The above-mentioned headlamp H as shown in FIG. 1 is pivotably supported by an outer headlamp support member 6 via the pins 7. A headlamp pivotal mechanism is attached to the outer headlamp support member 6, which comprises a step motor 8, a male threaded rod 9 geared with a female threaded hole formed in an upper projection 10 extending from the flange portion of the front cylindrical member 4, and a spring 12 disposed between an inner projection 11 extending from the inner circumferential surface of the headlight support member 6 and the upper projection 10 of the front cylindrical member 4.

A front end of the threaded rod 9 is loosely supported by a hole 11a formed in the inner projection 11 and further the step motor 8 is also movably supported in a hole formed at the rear surface of the headlamp support member 6 via an elastic member 8a. Therefore, when the threaded rod 9 is rotated clockwise or counterclockwise by the step motor 8, since the threaded rod 9 can be shifted a little in the radial direction of the headlamp support member 6 via the elastic member 8a, the upper projection 10 of the front cylindrical member 4 can be moved in the axial direction of the headlight support member 6 along the threaded rod 9 to pivot the headlamp H about the pins 7, so that it is possible to adjust the angle of optical axis of the headlamp in the upward or downward direction.

Figure 3:
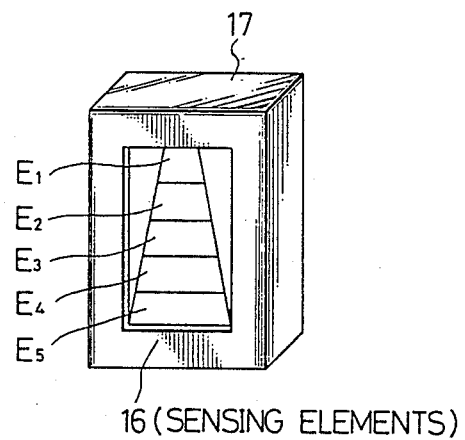
FIG. 3 is a perspective view for assistance in explaining the arrangement of five light sensing elements of the light sensor incorporated in the first embodiment.
Figure 4:
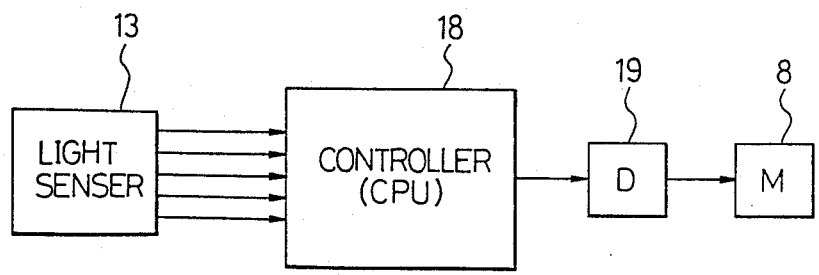
FIG. 4 is a schematic block diagram showing a controller for the headlight apparatus according to the present invention.

The rotational direction and the number of steps (or revolution) of the step motor 8 are controlled in response to sensor signals outputted from the light sensor 13 attached to the front lower end of the cylindrical member 4 for detecting the presence of a leading vehicle. This light sensor 13 comprises a small diameter condenser lens 15, a light sensing section 16 for receiving incident light passed through the condenser lens 15, and a sensor casing 14. Further, the light sensing section 16 is composed of five light sensing elements E1, E2, E3, E4 and E5 and an element box 17 for supporting these light sensing elements as shown in FIG. 3. Here, it is preferable from the economical standpoint to gradually increase the width or the area of each light sensing element in the downward direction in such a way that the width of the first sensing element E1 is wide enough to detect a distance (about 1.5 m) between two tail lamps of a leading vehicle running about infinite distance ahead from the headlight apparatus; the width of the third sensing element E3 is wide enough to detect a distance (about 1.5 m) between two tail lamps of a leading vehicle running about 40 m ahead therefrom; the width of the fifth sensing element E5 is wide enough to detect a distance (about 1.5 m) between two tail lamps of a leading vehicle running about 20 m ahead therefrom. These light sensing elements are image sensing elements such as a charge coupled device (CCD), for instance FIG. 4 is an example of control circuits of the headlight apparatus according to the present invention. Sensor signals outputted from the five light sensing elements E1 to E5 are applied to a controller (e.g. microcomputer or cpu) 18 and processed therein to output headlamp control signals for driving the step motor 8 via a motor driver circuit 19.

Figure 5:
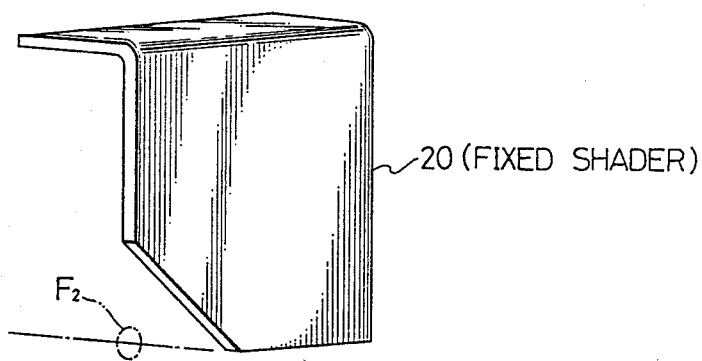
FIG. 5 is a perspective view showing a light shading plate incorporated in the first embodiment.

One of the features of the headlight apparatus according to the present invention is to dispose a beam shading plate (shader) 20 near the second focal point $F_2$ of the headlamp reflector 1 in order to prevent opposed vehicles' drivers from being dazzled by the light emitted from the headlight apparatus irrespective of the pivotal motion of the headlamp H. In the first embodiment, a fixed beam shading plate 20 is formed into a rectangular plate whose lower inner (inside) corner is cut out into a triangular shape as shown in FIG. 5. This fixed shading plate 20 is supported by the outer headlamp support member 6 by fixing an angled portion thereof to the inner circumferential surface of the support member 6 and by passing the rectangular plate through an opening 21 formed in the upper part of the front cylindrical member 4 in such a way that the lower inner cutout portion of the shading plate 20 is located near in front of the second focal point $F_2$ of the reflector 1. Therefore, the upper righthand side of the beam emitted from the headlight can be securely shaded by this fixed shading plate 20 for opposed vehicles' drivers. Here, it should be noted that since the fixed shading plate 20 is fixed to the headlamp support member 6 irrespective of the pivotal motion of the headlamp H, the beam can be always shaded for opposed vehicles, even if the optical axis of the headlamp is adjusted according to distance to a leading vehicle.

Figure 6:
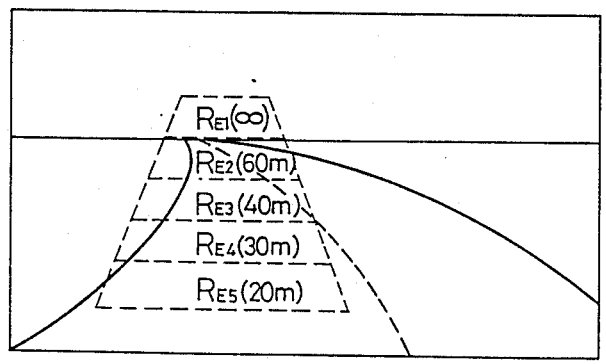
FIG. 6 is an illustration for assistance in explaining a pattern of leading vehicle detection areas of the light sensing elements in the light sensor.

The operation of the headlight apparatus according to the present invention will be described hereinbelow with reference to FIGS. 6 and 7. The gist of the control operation thereof is to adjust the optical axis of the headlamp according to distance to a leading vehicle in such a way that the headlight hot (brightest) zone is directed to the lower ends of two rear wheels of a leading vehicle. To adjust the optical axis of the headlight as described above, the headlamp H is always so controlled that the third (middle) sensing element E3 (for instance) detects two tail lamps (about 1.5 m apart from each other) of a leading vehicle.

As always described, for instance, the first sensing element E1 is so arranged as to provide a first detection range $R_{E1}$ within which two tail lamps of a leading vehicle running infinite distance (e.g. 80 m or longer) ahead from the headlight apparatus can be detected; the second sensing element E2 is so arranged as to provide a second detection range $R_{E2}$ within which two tail lamps of a leading vehicle running 60 m, for instance, ahead from the headlight apparatus can be detected; the third sensing element E3 is so arranged as to provide a third detection range $R_{E3}$ within which two tail lamps of a leading vehicle running 40 m, for instance, ahead from the headlight apparatus can be detected; the fourth sensing element E4 is so arranged as to provide a fourth detection range $R_{E4}$ within which two tail lamps of a leading vehicle running 30 m, for instance, ahead from the headlight apparatus can be detected; and a fifth sensing element E5 is so arranged as to provide a fifth detection range $R_{E5}$ within which two tail lamps of a leading vehicle running 20 m, for instance, ahead from the headlight apparatus can be detected. Further, some of these sensing elements E1 to E5 detect opposed vehicles depending upon circumstances, as shown in FIG. 6.

Figure 7:
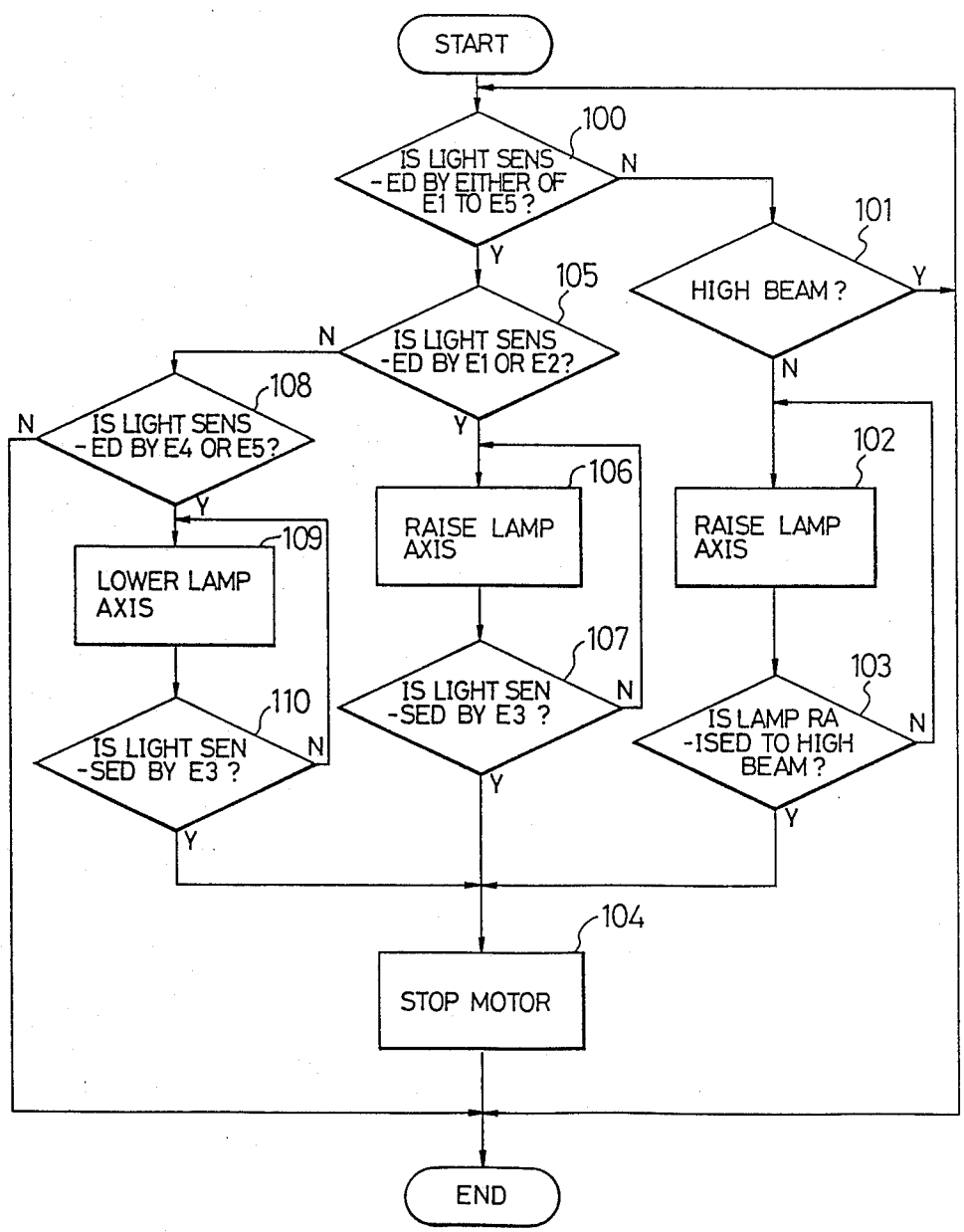
FIG. 7 is a control flowchart for assistance in explaining the operation of the controller shown in FIG. 4.

With reference to FIG. 7, controller or CPU first checks whether either of the five light sensing elements E1 to E5 detects tail lamps of a leading vehicle (in step 100). If no light sensing elements detect tail lamps of a leading vehicle (NO in step 100), since this indicates that there exists no leading vehicle, CPU checks whether the headlamp H is set to high beam (in step 101). If high beam (YES in step 101), control ends. If not high beam (NO in step 101), CPU outputs a control signal to the step motor 8 to raise the optical axis of the headlamp in the upward direction (in step 102). Thereafter, CPU checks whether the optical axis thereof is raised to a high beam position (in step 103). If not raised to a high beam position (NO in step 103), CPU repeats the step 102 above. If the headlamp has been raised to a high beam position (YES in step 103), CPU stops the step motor 8 (in step 104), ending the control operation.

On the other hand, if CPU determines that either of the five light sensing elements E1 to E5 detects two tail lamps of a leading vehicle (YES in step 100), CPU checks whether the light sensing element E1 or E2 detects tail lamps of a leading vehicle (in step 105). If the light sensing element E1 or E2 detects tail lamps of a leading vehicle (YES in step 105), since this indicates that there exists a leading vehicle at a long distance, CPU outputs a control signal to the step motor 8 to raise the optical axis of the headlamp in the upward direction (in step 106). Thereafter, CPU checks whether the optical axis thereof is raised and therefore the third sensing element E3 detects tail lamps of a leading vehicle (in step 107). If the third sensing element E3 does not detect tail lamps (NO in step 107), CPU repeats the step 106. If the third sensing element E3 detects tail lamps (YES in step 107), CPU stops the step motor 8 (in step 104), ending the control operation.

On the other hand, if CPU determines that the light sensing element E1 or E2 does not detect tail lamps (NO in step 105), since this indicates that there exists a leading vehicle at a short distance, CPU checks whether the light sensing element E4 or E5 detects tail lamps (in step 108). If the element E4 or E5 does not detect tail lamps (NO in step 108), since this indicates that the third element E3 detects tail lamps, control ends. If the sensing element E4 or E5 detects tail lamps (YES in step 108), CPU outputs a control signal to the step motor 8 to lower the optical axis of the headlamp in the downward direction (in step 109). Thereafter, CPU checks whether the optical axis thereof is lowered and therefore the third sensing element E3 detects tail lamps (in step 110). If No (in step 110), CPU repeats the above step 109. If YES (in step 110), CPU stops the step motor 8 (in step 104), ending the control operation. The above-mentioned control operation is repeated in a predetermined cycle.

Figure 13:
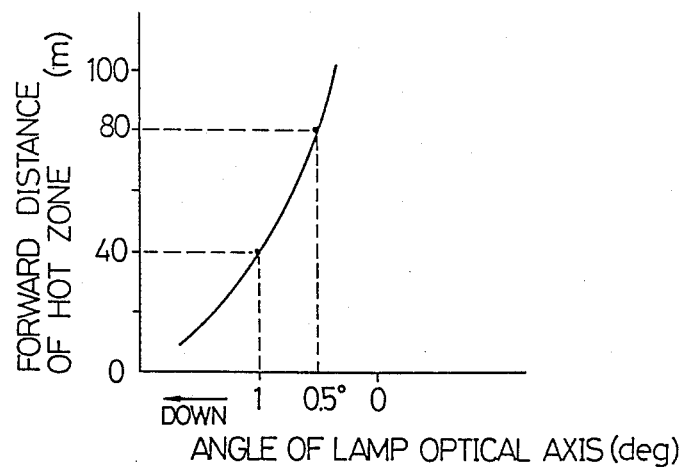
FIG. 13 is a graphical representation showing the relationship between the forward distance of hot (brightest) zone and the angle of the headlamp optical axis.

As described above, whenever there exists a leading vehicle and therefore any one of the five light sensing elements E1 to E5 detects two tail lamps of a leading vehicle, the optical axis of the headlamp is so adjusted that the third light sensing element E3 always detects two tail lamps of a leading vehicle. Therefore, it is possible to always set the headlight hot (brightest) zone to the lower ends of rear wheels of a leading vehicle by previously determining the relationship between the angle of optical axis of the headlamp (i.e. light sensor 13) and the forward distance of headlamp hot zone, for instance as shown in FIG. 13. Therefore, it is possible to prevent the driver of a leading vehicle from being dazzled by the beam from the headlight apparatus, while sufficiently illuminating all the area from the headlight apparatus to a leading vehicle when the vehicle is running at high speed.

In the above-mentioned first embodiment, the angle of optical axis of the headlamp can be controlled only when a leading vehicle is detected, irrespective of the presence or absence of opposed vehicles. In other words, light emitted frontward can fixedly be shaded by the light shading plate 20 fixed to the outer headlamp support member 6. Since the shading plate 20 is fixed to the outer headlight support member 6, even if the headlamp H is pivoted in the upward direction, it is possible to securely shade the headlamp light from opposed vehicles, thus preventing opposed vehicle's driver from being dazzled.

Figure 8:
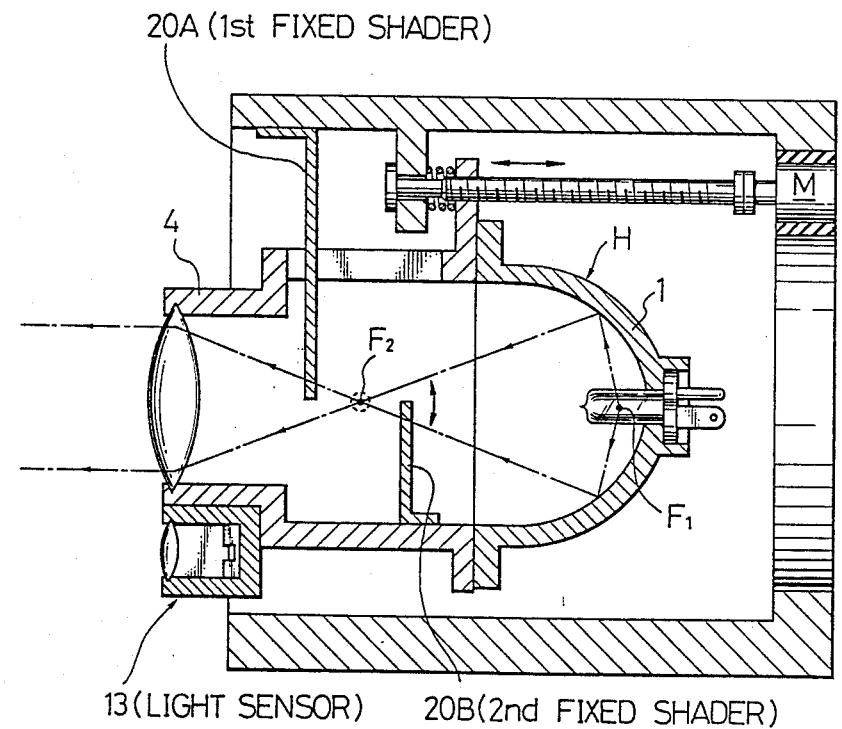
FIG. 8 is a cross-sectional view showing a second embodiment thereof.
Figure 9:
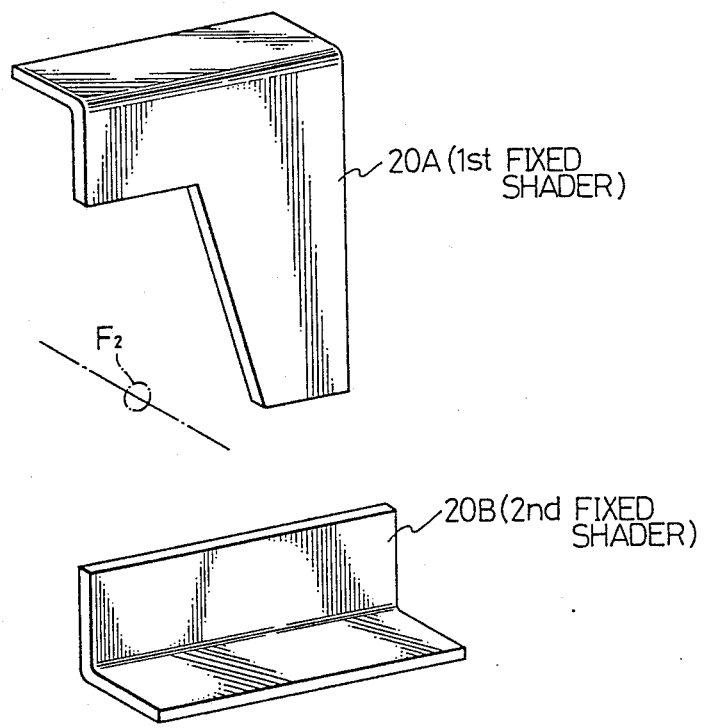
FIG. 9 is a perspective view showing two light shading plates incorporated in the second embodiment.

FIGS. 8 and 9 show a second embodiment of the headlight apparatus according to the present invention. The feature of this embodiment is to provide a second fixed beam shading plate (shader) 20B in back of and near the second focal point $F_2$ of the reflector 1 in addition to the first fixed beam shading plate (shader) 20A. The second embodiment is the same in structure as the first embodiment except the above. The second shading plate 20B is fixed to the lower circumferential surface of the front cylindrical member 4 of the headlamp H so as to be movable up and down together with the headlamp H whose optical axis is adjustable. The upper end of the second, fixed shading plate 20B is located in back of and near the second focal point $F_2$ in such a way as to sandwich the second focal point $F_2$ by two first and second fixed shading plates 20A and 20B at equal distances apart from the point $F_2$. FIG. 9 shows the shapes of the first and second beam shading plates 20A and 20B. The first shading plate 20A is formed into roughly an L-shaped plate whose lower inner (inside) corner is cut out into a trapezoidal shape as shown, which is larger in size than the cutout of the first embodiment shown in FIG. 5. This first shading plate 20A serves only to shade the headlight for opposed vehicles. On the other hand, the second shading plate 20B is formed into a short rectangular shape as shown. This second shading plate 20B serves only to shade headlight for a leading vehicle or to more clearly define the shade upper line of the headlight emitted from the headlight apparatus to a leading vehicle running on the same lane. Therefore, in this second embodiment, when the optical axis of the headlamp H is adjusted in the upward direction, the beam is shaded by the first fixed shading plate 20A for opposed vehicles' drivers irrespective of the position of the headlamp optical axis and further by the second fixed shading plate 20B for a leading vehicle's driver in synchronism with the motion of the headlamp optical axis, thus securely preventing other drivers of both leading and opposed vehicles from being dazzled.

Figure 10:
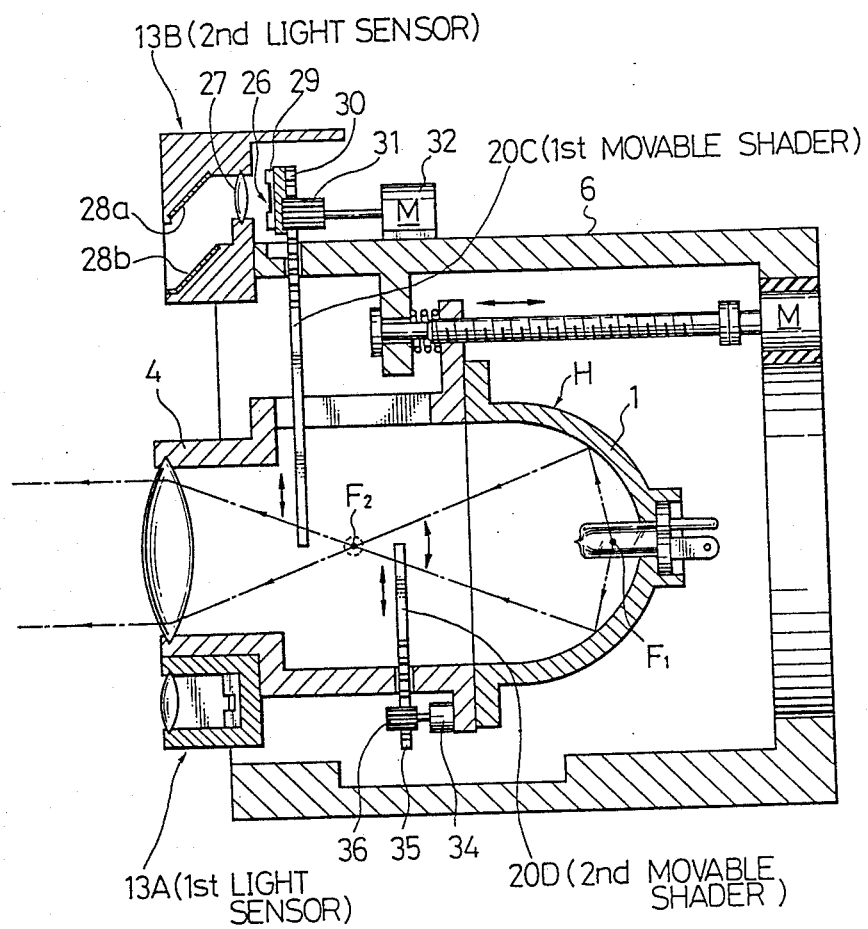
FIG. 10 is a cross-sectional view showing a third embodiment thereof.

FIG. 10 shows a third embodiment. The feature of this embodiment is to provide a first light sensor 13A for detecting the presence of a leading vehicle (as in the first and second embodiments), a second light sensor 13B for detecting the presence of opposed vehicles running on an opposite lane, a first movable beam shading plate (shader) 20C movable relative to the headlamp support member 6 to shade light for opposed vehicles' drivers on the basis of sensor signals outputted from the second light sensor 13B, and a second movable beam shading plate (shader) 20D movable relative to the reflection 1 according to the optical axis motion of the headlamp H so that the light distribution angle between the brightest headlight zone and the upper headlight shade line can be adjusted according to distance to a leading vehicle.

The first light sensor 13A is substantially the same as that used in the first or second embodiment as shown in FIG. 2 or 8. The second light sensor (opposed vehicle sensor) 13B is disposed on the upper front end of the headlight support member 6, and is composed of a light sensing section 26, a lens 27, and a pair of mirror plates 28a and 28b. The light sensing section 26 is composed of five light sensing elements E1 to E5 in the same way as in the first and second embodiments and supported by an element box 29 fixed to the first movable shading plate 20C at a position a little offset in the outer (outside) direction (on the opposed vehicle side). However, the sensitivity of this second light sensor 13B is lower than that of the first light sensor 13A.

The first movable shading plate 20C is formed with a rack 30 geared with a pinion 31 driven by a step motor 32 fixed to the headlamp support member 6. This first movable shading plate 20C is moved substantially in the same way as the flowchart shown in FIG. 7. That is, the first movable shading plate 20C is moved up and down so that light emitted from opposed vehicles is always detected by the third (middle) light sensing element E3 of the light sensing section 26.

As described above, whenever there exists an opposed vehicle and therefore either one of five light sensing elements detects the headlight of an opposed vehicle, the first movable shading plate 20C is moved downward so that the third light sensing element E3 always detects the headlight of the opposed vehicle. Therefore, it is possible to appropriately set the upper headlight shade line for the opposed vehicle by previously determining the relationship between the radial position of the first movable shading plate 20C and the upper headlight shade line, for instance as shown on the right half side in FIG. 11. Therefore, it is possible to prevent the driver of an opposed vehicle from being dazzled by the beam from the headlight apparatus.

Figure 12A:
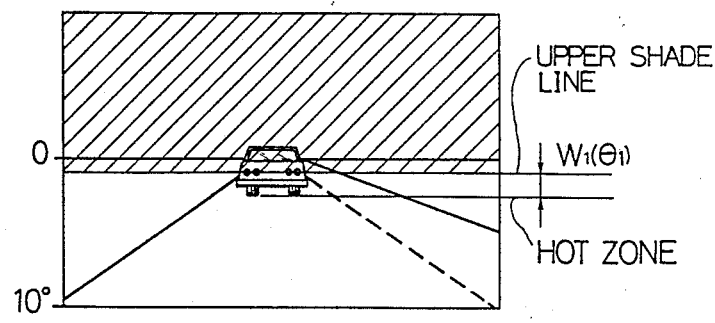
FIGS. 12(A) and (B) are illustrations for assistance in explaining that the light distribution angle (width) between the brightest headlight zone and the upper headlight shade line can be adjusted according to distance to a leading vehicle.
Figure 12B:
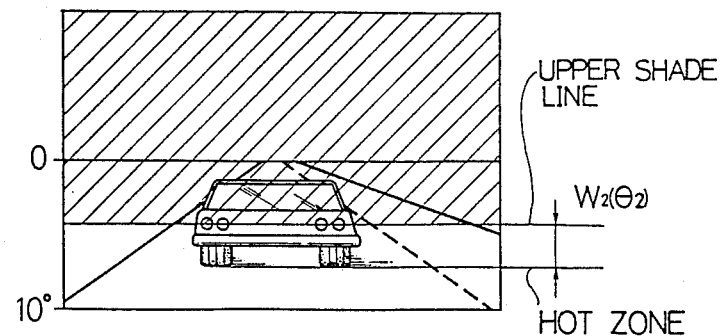

The second movable shading plate 20D is also formed with a rack 35 geared with a pinion 36 driven by a step motor 34 fixed to the front cylindrical member 4. This second movable shading plate 20D is moved in the upward direction when the optical axis of the headlamp H is moved upward and in the downward direction when the optical axis of the headlamp H is adjustably moved downward. In more detail, since the optical axis of the headlamp is adjusted to such a position that tail lamps of a leading vehicle can be detected by the third (middle) light sensing element E3 of the first light sensor 13A and therefore the brightest headlight zone reaches the lower ends of rear wheels of a leading vehicle, for instance, it is necessary to adjust the light distribution angle (width) between the brightest headlight zone (rear wheel lower end position) and the upper headlight shade line (tail lamp position) according to the distance to a leading vehicle in order to securely shade headlight for a leading vehicle's driver, as shown in FIGS. 12(A) and 12(B). Therefore, the second movable shading plate 20B is moved up and down in synchronism with the optical axis motion of the headlamp H by previously determining the relationship between the width W (between the rear wheel lower ends and the tail lamps of a leading vehicle) or the light distribution angle $\theta$ (between the brightest zone and the upper headlight shade line) and the forward distance to a leading vehicle, for instance as shown in FIGS. 12(A), 12(B) and FIG. 14.

Figure 11:
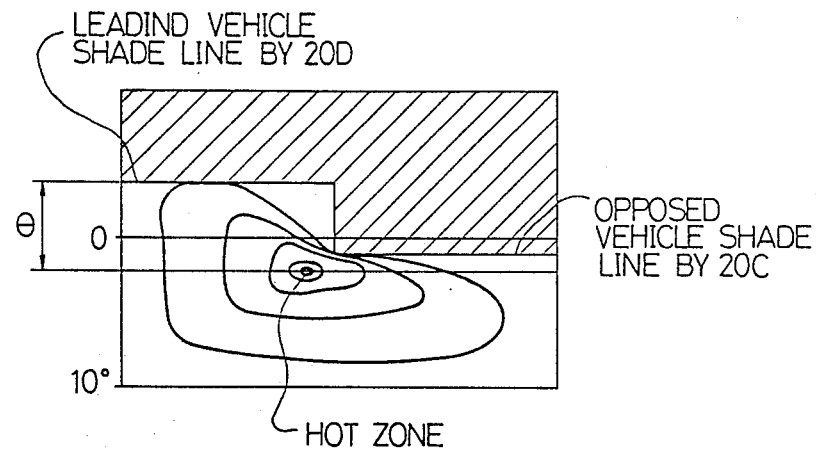
FIG. 11 is an illustration for assistance in explaining a distribution of headlamp illumination intensity of the third embodiment shown in FIG. 10.

FIG. 11 shows an example of the upper headlight shade line obtained when no leading vehicle is detected by the first light sensor 13A and an opposed vehicle is detected by the second light sensor 13B. FIG. 12(A) shows another example obtained when no opposed vehicle is detected and a leading vehicle running at a long distance ahead from the headlight apparatus is detected by the first light sensor 13A. In this case, since the optical axis of the headlamp H is moved in the upward direction, the second movable shading plate 20D is also moved in the upward direction, so that the upper shade line for a leading vehicle is lowered relative to the hot (brightest) zone. As a result, the illumination angle $\theta$ between the hot zone and the leading vehicle shade line decreases. For instance, when the hot (brightest) zone of the headlight is adjusted to the lower ends of the rear wheels of a leading vehicle in relation to the angle of optical axis of the headlamp H or the first light sensor 13A, since the upper illumination range $W_1$ as shown in FIG. 12(A) is also narrowed, it is possible to prevent the leading vehicle's driver from being dazzled. FIG. 12(B) shows still another example obtained when no opposed vehicle is detected and a leading vehicle running at a short distance ahead from the headlight apparatus is detected by the first light sensor 13A. In this case, since the optical axis of the headlamp H is moved in the downward direction, the second movable shading plate 20D is also moved in the downward direction, so that the upper shade line for a leading vehicle is raised relative to the hot (brightest) zone. As a result, the illumination angle θ between the hot zone and the leading vehicle shade line increases. In this case, since the upper illumination range W₂ as shown in FIG. 12(B) is also widened, it is possible to increase the illumination range while preventing the leading vehicle's driver from being dazzled.

Figure 14:
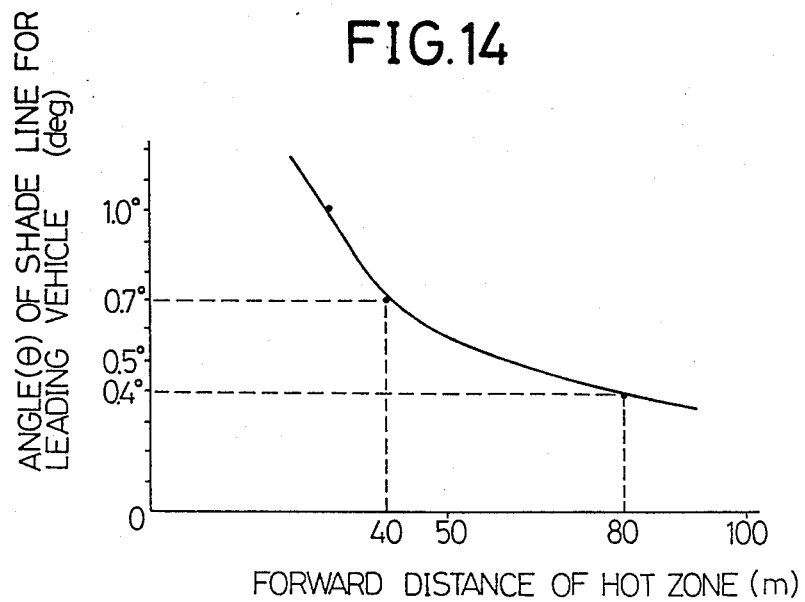
FIG. 14 is a graphical representation showing the relationship between the angle of shading line for leading vehicle and the forward distance of hot (brightest) zone.

FIG. 13 shows a typical design standard of the relationship between the angle of optical axis of the headlamp and the forward distance of the hot zone, and FIG. 14 shows a typical design standard of the relationship between the forward distance of the hot zone and the angle θ of the shade line for leading vehicles. In accordance with these design standards, the headlamp H can be so designed that the hot zone is obtained at a distance 80 m ahead when pivoted 0.5 degrees in the downward direction and at a distance 40 m ahead when pivoted 1 degree in the downward direction. Further, the second movable shading plate 20D is so designed that the angle θ of the shade line for a leading vehicle from the hot zone is 0.4 degrees when the headlamp H is pivoted 0.5 degrees in the downward direction (the hot zone is 80 m ahead) and 0.7 degrees when pivoted 1 degree in the downward direction (the hot zone is 40 m ahead).

In this third embodiment, since the second light sensor 13B is additionally provided for detecting the presence of opposed vehicles and further the first movable shading plate 20C is moved up and down in response to sensor signals from the second light sensor 13B, it is possible to more reliably prevent opposed vehicles' drivers from being dazzled. Further, since the second shading plate 20D is moved up and down to adjust the upper headlight shade line for leading vehicle according to the distance to a leading vehicle, it is possible to move accurately shade the headlight for leading vehicles' drivers.

Two headlight apparatus according to the present invention are mounted on an automotive vehicle. However, it is also possible to mount a single headlight apparatus according to the present invention only on an opposed vehicle side and an ordinary headlight whose optical axis is adjusted a little downward on the other side.

As described above, in the headlight apparatus according to the present invention, since the optical axis of the headlamp is controlled according to distance to a leading vehicle, it is possible to illuminate all the area to the leading vehicle without dazzling a leading vehicle's driver via a rearview mirror of the leading vehicle. In addition, since a fixed or movable shading plate is provided without being subjected to the influence of adjustable motion of the headlamp, it is possible to reliably prevent opposed vehicles' drivers from being dazzled by the headlight.

What is claimed is:

1. A headlight apparatus for an automotive vehicle, comprising:
   (a) headlamp means for emitting light in such a way that an optical axis of the light can be adjusted;
   (b) first sensor means, attached to said headlamp means, for detecting a presence of a leading vehicle and generating sensor signals corresponding thereto;
   (c) adjusting means, associated with said headlamp means, for adjusting the optical axis of said headlamp means;
   (d) control means, coupled to said first sensor means and said adjustment means, for actuating said adjusting means in such a way that a position of the axis of said headlamp means can be adjusted to illuminate a predetermined area determined according to a distance to the leading vehicle in response to a signal detected by said first sensor means; and
   (e) first fixed shading means, fixedly disposed independently from optical axis motion of said headlamp means, for shading part of light emitted by said headlamp means for an opposed vehicle.

2. The headlamp apparatus of claim 1, wherein said first sensor means comprises a plurality of vertically arranged light sensing elements, and said control means actuates said headlamp means via said adjusting means in response to plural sensor signals generated by said first sensor means to such a position that tail lamps of a leading vehicle can be detected by a middle light sensing element of said first sensor means when the brightest headlight zone of said pivotal headlamp means reaches lower end portions of rear wheels of the leading vehicle.

3. The headlamp apparatus of claim 1, wherein said first fixed shading means is a rectangular plate whose lower inner corner is cut out into a triangular shape and is arranged with the triangular cutout portion thereof located near the optical axis of said headlamp means.

4. The headlamp apparatus of claim 1, wherein said first fixed shading means is a substantially rectangular plate whose lower inner corner is cut out into a trapezoidal shape and is arranged with the trapezoidal cutout portion thereof located near the optical axis of said headlamp means.

5. The headlamp apparatus of claim 1, which further comprises a second fixed shading means, disposed on said headlamp means, for clearly defining an upper shade line of headlights for a leading vehicle.

6. The headlamp apparatus of claim 1, wherein said first fixed shading means is a first movable shading means disposed independently from the pivotal motion of said headlamp means, and which further comprises:
   (a) second sensor means fixedly disposed independently from said motion of said pivotal headlamp means and coupled to said control means, for detecting the presence of an opposed vehicle and generating sensor signals corresponding thereto;
   (b) first actuating means, associated with said first movable shading means and coupled to said control means, for moving said first movable shading means; said control means actuating said first movable shading means via said first actuating means in response to sensor signals generated by said second sensor means to move said first movable shading means to such a position that headlights of an opposed vehicle can be detected by a predetermined position on said second sensor means and therefore an upper shade line of said headlights can be defined for a detected opposed vehicle.

7. The headlamp apparatus of claim 6, wherein said second fixed shading means comprises movable shading means movably disposed on said headlamp means, and which further comprises second actuating means, associated with said second movable shading means and coupled to said control means, for moving said second movable shading means; said control means actuating said second movable shading means via said second actuating means according to the optical axis motion of said headlamp means so that light distribution angle between the brightest headlight zone and the upper headlight shade line can be adjusted according to distance to a leading vehicle.

8. A headlight apparatus for an automotive vehicle, comprising:
 (a) headlamp means for emitting light in such a way that an optical axis of the light can be adjusted;
 (b) first sensor means having a plurality of vertically arranged light sensing elements, attached to said headlamp means, for detecting presence of a leading vehicle and generating sensor signals corresponding thereto;
 (c) adjusting means, associated with said headlamp means, for adjusting the optical axis of said headlamp means;
 (d) control means, coupled to said first sensor means and said adjusting means, for actuating said adjusting means in such a way that tail lamps of a leading vehicle can be detected by a predetermined light sensing element of said first sensor means when the brightest headlight zone of said headlamp means reaches a predetermined lower portion of a leading vehicle and therefore an angle of an optical axis of said headlamp means can be adjusted according to distance to a leading vehicle; and
 (e) first fixed shading means, fixedly disposed independently from optical axis motion of said headlamp means, for shading part of light emitted by said headlamp means for an opposed vehicle.

* * * * *